US011616865B2

(12) United States Patent
Jeong et al.

(10) Patent No.: US 11,616,865 B2
(45) Date of Patent: Mar. 28, 2023

(54) FOLDABLE ELECTRONIC DEVICE HAVING WIRELESS COMMUNICATION CIRCUITS DISTRIBUTIVELY ARRANGED AROUND FOLDING AXIS

(71) Applicant: Samsung Electronics Co., Ltd., Gyeonggi-do (KR)

(72) Inventors: Iiltaek Jeong, Gyeonggi-do (KR); Myeongsu Oh, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/270,689

(22) PCT Filed: Apr. 18, 2019

(86) PCT No.: PCT/KR2019/004708
§ 371 (c)(1),
(2) Date: Feb. 23, 2021

(87) PCT Pub. No.: WO2020/045786
PCT Pub. Date: Mar. 5, 2020

(65) Prior Publication Data
US 2021/0344783 A1 Nov. 4, 2021

(30) Foreign Application Priority Data

Aug. 28, 2018 (KR) .................. 10-2018-0101258

(51) Int. Cl.
*H04M 1/02* (2006.01)
*H04B 1/00* (2006.01)
*G06F 1/16* (2006.01)

(52) U.S. Cl.
CPC ........ *H04M 1/0216* (2013.01); *G06F 1/1616* (2013.01); *G06F 1/1652* (2013.01);
(Continued)

(58) Field of Classification Search
CPC .. H04M 1/0216; H04M 1/026; H04M 1/0266; H04M 1/0268; H04M 1/0277;
(Continued)

(56) References Cited

U.S. PATENT DOCUMENTS 8,200,302 B2 6/2012 Yamamoto et al.
10,063,677 B2 * 8/2018 Cavallaro ............. G06F 1/1652
(Continued)

FOREIGN PATENT DOCUMENTS

EP 3 343 693 7/2018
KR 100744363 7/2007
(Continued)

OTHER PUBLICATIONS

European Search Report dated Dec. 10, 2021 issued in counterpart application No. 19855046.9-1216, 12 pages.
(Continued)

*Primary Examiner* — Quochien B Vuong
(74) *Attorney, Agent, or Firm* — The Farrell Law Firm, P.C.

(57) ABSTRACT

An electronic device according to various embodiments of the present invention can comprise: a foldable housing, which comprises a hinge structure, a first housing structure connected to the hinge structure and including a first surface facing a first direction, a second surface facing a second direction that is opposite to the first direction, and a first side member that encompasses at least a portion of the space between the first and second surfaces and includes at least one first conductive part, and a second housing structure connected to the hinge structure, including a third surface facing a third direction, a fourth surface facing a fourth direction that is opposite to the third direction, and a second side member that encompasses at least a portion of the space between the third and fourth surfaces and includes at least (Continued)

one second conductive part, and which comes into contact with the first housing structure with the hinge structure as the center thereof, wherein the first surface faces the third surface in a folded state and the third direction is the same as the first direction in an unfolded state; a flexible display extending from the first surface to the third surface; a first communication processor arranged inside the first housing structure; a first wireless communication circuit arranged inside the first housing structure, electrically connected to the first conductive part and the first communication processor, and configured to transmit and/or receive a first signal having a first frequency; and a second wireless communication circuit arranged inside the second housing structure, electrically connected to the second conductive part and the first communication processor, and configured to transmit and/or receive a second signal having a second frequency. Other various embodiments are possible.

13 Claims, 8 Drawing Sheets

(52) U.S. Cl.
CPC .......... G06F 1/1681 (2013.01); G06F 1/1683 (2013.01); H04B 1/005 (2013.01); H04M 1/0268 (2013.01); H04M 1/0277 (2013.01)

(58) Field of Classification Search
CPC .... H04B 1/005; H04B 1/0053; H04B 1/0064; G06F 1/1616; G06F 1/1652; G06F 1/1681; G06F 1/1683
See application file for complete search history.

(56) References Cited

U.S. PATENT DOCUMENTS

| | | | |
|---|---|---|---|
| 10,469,635 B1* | 11/2019 | Carlson | H04M 1/0268 |
| 10,965,796 B2* | 3/2021 | Yang | G06F 1/1681 |
| 11,158,929 B2* | 10/2021 | Shi | G06F 1/16 |
| 2003/0117324 A1 | 6/2003 | Iwai et al. | |
| 2006/0118625 A1 | 6/2006 | Sekita | |
| 2012/0307423 A1 | 12/2012 | Bohn et al. | |
| 2014/0240178 A1 | 8/2014 | Chun et al. | |
| 2015/0277496 A1* | 10/2015 | Reeves | G06F 1/1652 345/1.2 |
| 2015/0338888 A1 | 11/2015 | Kim et al. | |
| 2017/0142241 A1 | 5/2017 | Kim et al. | |
| 2018/0366813 A1 | 12/2018 | Kim et al. | |

FOREIGN PATENT DOCUMENTS

| | | |
|---|---|---|
| KR | 100885361 | 2/2009 |
| KR | 1020140105886 | 9/2014 |
| KR | 1020160032079 | 3/2016 |
| KR | 1020170056292 | 5/2017 |
| KR | 1020170066944 | 6/2017 |

OTHER PUBLICATIONS

PCT/ISA/210 Search Report issued on PCT/KR2019/004708, dated Jul. 29, 2019, pp. 7.
PCT/ISA/237 Written Opinion issued on PCT/KR2019/004708, dated Jul. 29, 2019 pp. 6.
Korean Office Action dated Jan. 30, 2023 issued in counterpart application No. 10-2018-0101258, 7 pages.
European Search Report dated Dec. 19, 2022 issued in counterpart application No. 19855046.9-1224, 11 pages.

\* cited by examiner

FOLDABLE ELECTRONIC DEVICE HAVING WIRELESS COMMUNICATION CIRCUITS DISTRIBUTIVELY ARRANGED AROUND FOLDING AXIS

PRIORITY

This application is a National Phase Entry of PCT International Application No. PCT/KR2019/004708 which was filed on Apr. 18, 2019, and claims priority to Korean Patent Application No. 10-2018-0101258, which was filed on Aug. 28, 2018, the content of each of which is incorporated herein by reference.

TECHNICAL FIELD

Various embodiments of the disclosure relate to a foldable electronic device configured to perform wireless communication while supporting radiation performance in various frequency bands.

BACKGROUND ART

An electronic device may have a folding axis and a housing that can be folded and unfolded around the folding axis. A communication module supporting wireless communication of various frequency bands may be located in the internal space of the housing. For example, the housing can be divided into two housing structures around the folding axis.

DISCLOSURE OF INVENTION

Technical Problem

The electronic device may include a plurality of antennas supporting wireless communication in various frequency bands. The antennas may be arranged adjacent to the communication module to minimize power loss or signal distortion when transmitting and/or receiving an RF signal to and/or from the communication module. To this end, when a plurality of antennas are located in one place, it may be difficult to secure a space for arranging the antennas and communication circuits configured to perform wireless communication by being electrically connected to the antennas.

When a user grips an area where the antennas are densely located, the performance of wireless communication may be deteriorated due to the influence of the human body. For example, when a user holds an electronic device with his or her hand, the radiation performance may be deteriorated compared with otherwise. When a finger touches a touch screen, power loss of communication signals (e.g., fifth generation (5G) signals) occurs, which can lead to deterioration of the radiation performance.

Various embodiments of the disclosure may provide an electronic device configured to perform wireless communication by distributively arranging wireless communication circuits around a folding axis to allow more freedom in designing the internal space of the electronic device and to reduce deterioration of radiation performance in various frequency bands.

Solution to Problem

An electronic device according to various embodiments of the disclosure may include: a foldable housing configured to include a hinge structure, a first housing structure connected to the hinge structure and including a first surface facing a first direction, a second surface facing a second direction opposite the first direction, and a first side member that encompasses at least a portion of the space between the first and second surfaces and includes at least one first conductive part, and a second housing structure connected to the hinge structure and including a third surface facing a third direction, a fourth surface facing a fourth direction opposite the third direction, and a second side member that encompasses at least a portion of the space between the third and fourth surfaces and includes at least one second conductive part, the second housing structure brought into contact with the first housing structure with respect to the hinge structure as the center thereof, wherein the first surface faces the third surface in a folded state and the third direction is the same as the first direction in an unfolded state; a flexible display extending from the first surface to the third surface; a first communication processor arranged inside the first housing structure; a first wireless communication circuit arranged inside the first housing structure, electrically connected to the first conductive part and the first communication processor, and configured to transmit and/or receive a first signal having a first frequency; and a second wireless communication circuit arranged inside the second housing structure, electrically connected to the second conductive part and the first communication processor, and configured to transmit and/or receive a second signal having a second frequency.

An electronic device according to various embodiments of the disclosure may include: a foldable housing configured to include a hinge structure, a first housing structure connected to the hinge structure and including a first surface facing a first direction, a second surface facing a second direction opposite the first direction, and a first side member that encompasses at least a portion of the space between the first and second surfaces and includes at least one conductive part, and a second housing structure connected to the hinge structure and including a third surface facing a third direction, a fourth surface facing a fourth direction opposite the third direction, and a second side member that encompasses at least a portion of the space between the third and fourth surfaces, the second housing structure brought into contact with the first housing structure with respect to the hinge structure as the center thereof, wherein the first surface faces the third surface in a folded state and the third direction is the same as the first direction in an unfolded state; a flexible display extending from the first surface to the third surface; a first communication processor arranged inside the first housing structure; a second communication processor arranged inside the second housing structure and electrically connected to the first communication processor; a first wireless communication circuit arranged inside the first housing structure, electrically connected to the conductive part and the first communication processor, and configured to transmit and/or receive a first signal having a first frequency; an antenna structure arranged inside the second housing structure and including a printed circuit board and at least one antenna element; and a second wireless communication circuit electrically connected to the antenna element and the second communication processor and configured to transmit and/or receive a second signal having a second frequency.

Advantageous Effects of Invention

According to various embodiments of the disclosure, wireless communication circuits may be distributively arranged around a folding axis, so that it can be more free in the constraints of the internal space of the electronic device. Even if the electronic device is gripped, radiation performance can be secured according to the distributive arrangement of several antennas.

MODE FOR THE INVENTION

Figure 1:
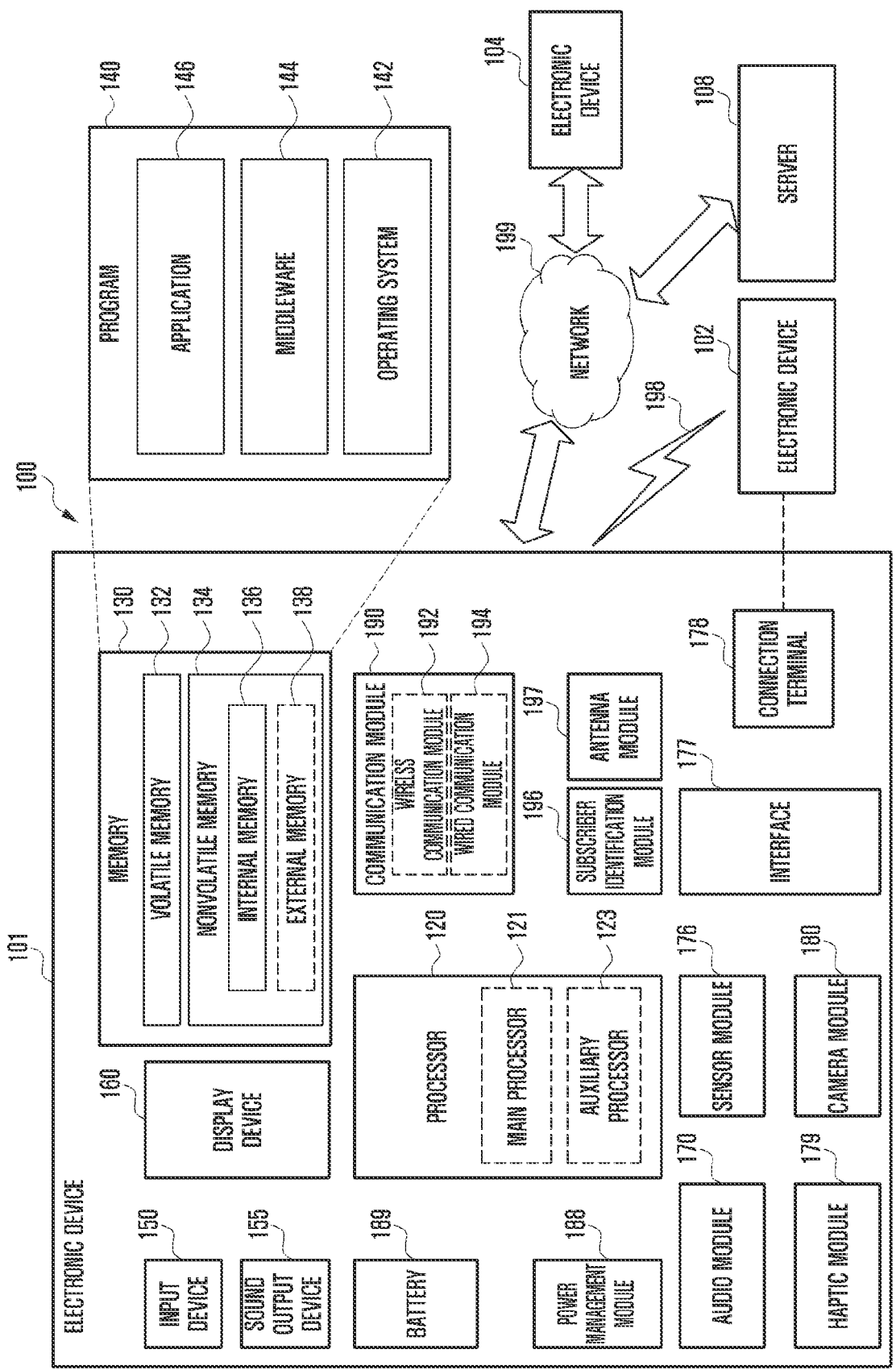
FIG. 1 illustrates an electronic device in a network environment in various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134.

According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes. The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
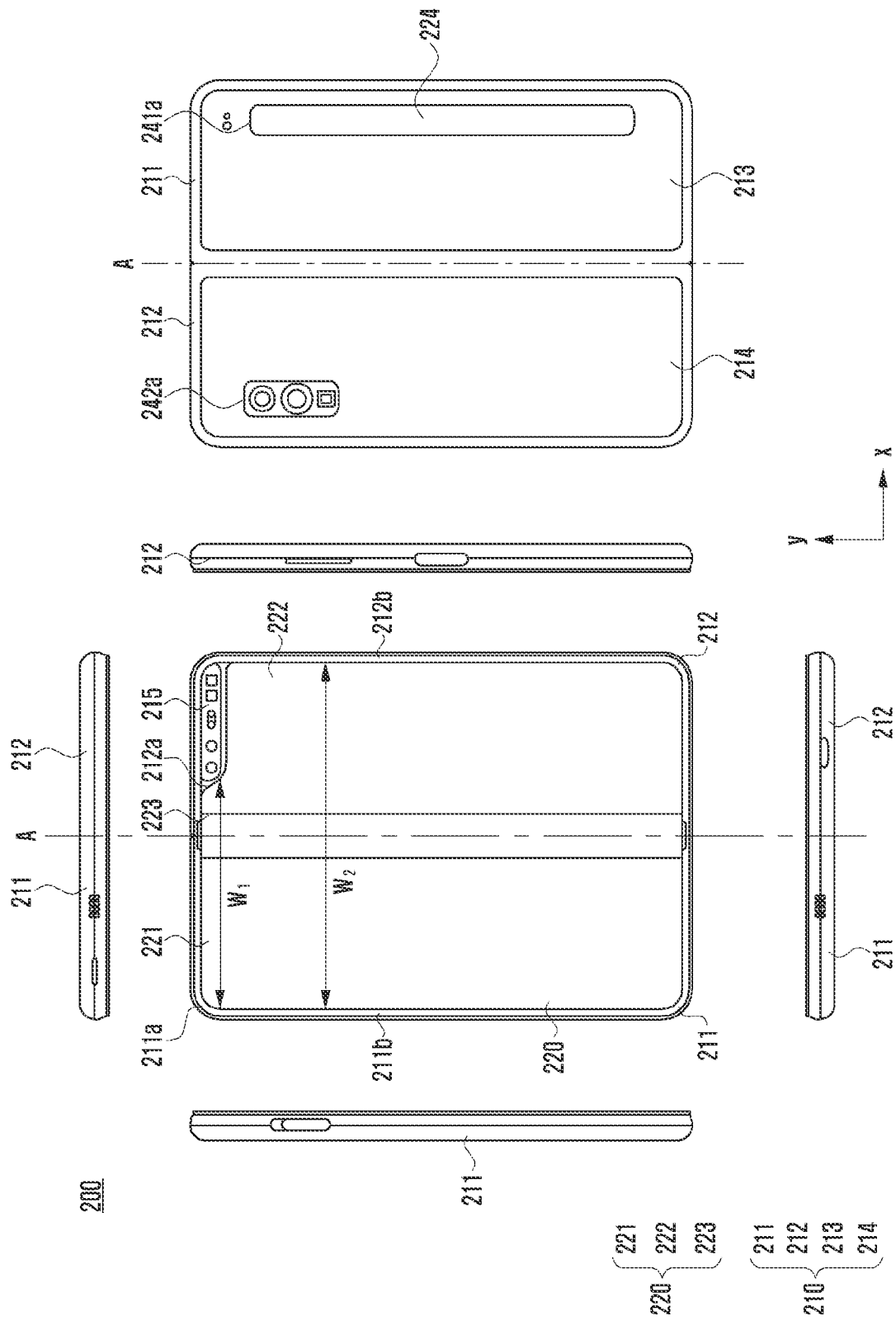
FIG. 2A is a diagram illustrating an unfolded state of an electronic device according to various embodiments.
Figure 2B:
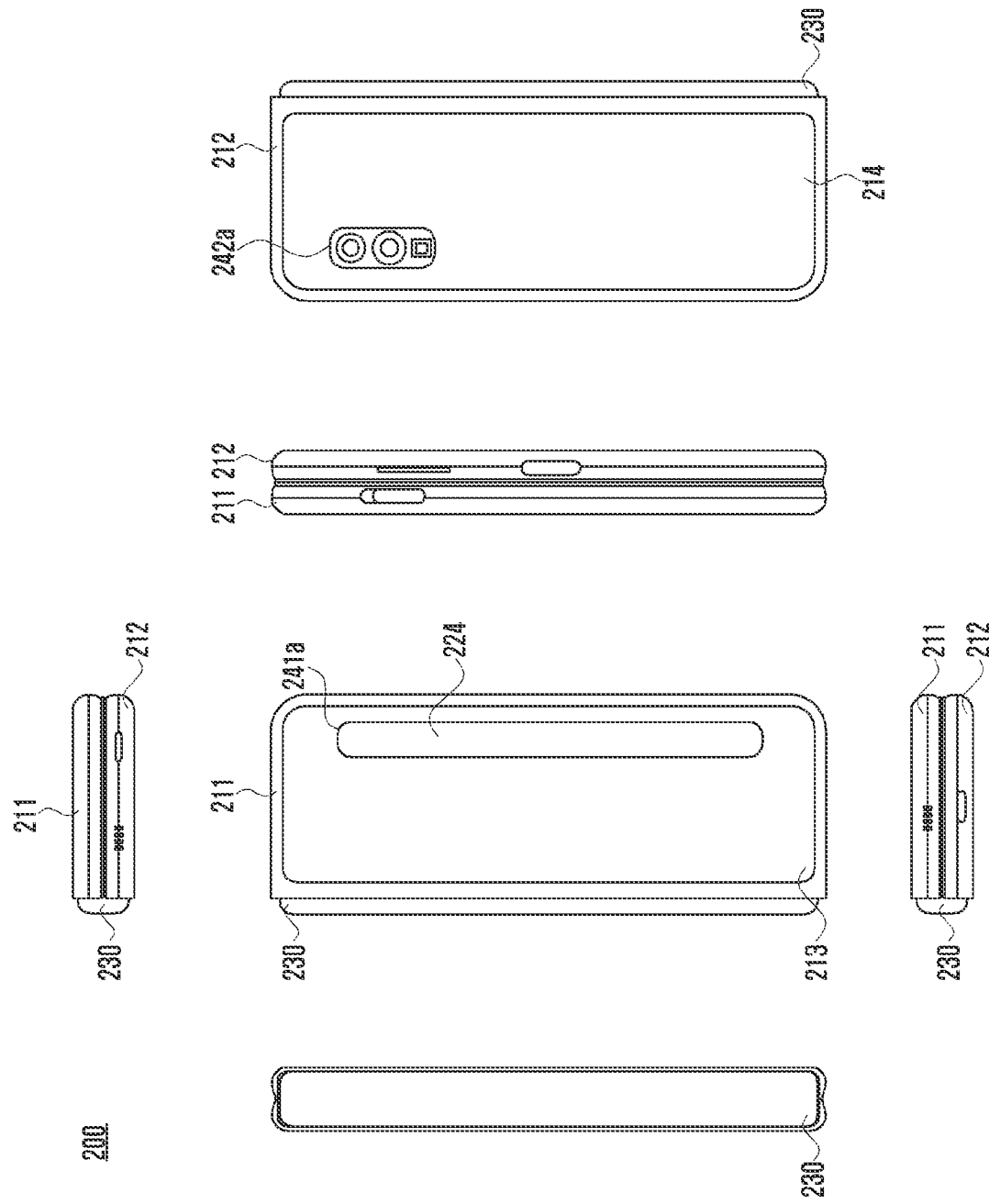
FIG. 2B is a diagram illustrating a folded state of the electronic device of FIG. 2A.
Figure 2C:
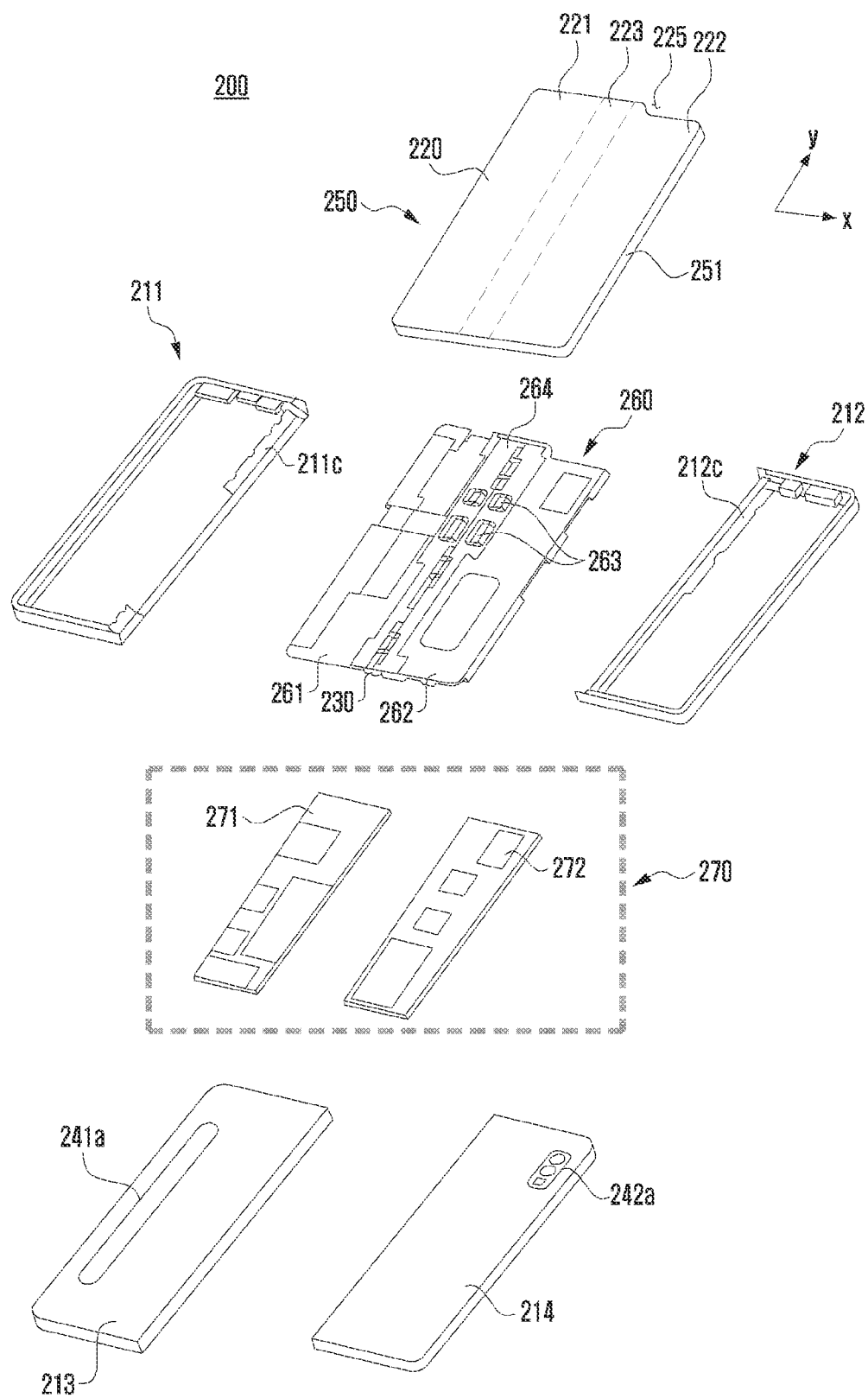
FIG. 2C is an exploded perspective diagram illustrating the electronic device of FIG. 2A.

FIG. 2A is a diagram illustrating an unfolded state of an electronic device according to various embodiments, FIG. 2B is a diagram illustrating a folded state of the electronic device of FIG. 2A, and FIG. 2C is an exploded perspective diagram illustrating the electronic device of FIG. 2A. Referring to FIGS. 2A, 2B, and 2C, an electronic device 200 (e.g., the electronic device 101 in FIG. 1) may include a foldable housing 210, a hinge cover 230 covering a foldable portion of the foldable housing 210, and a flexible or foldable display 220 (hereinafter, referred to as the display 220) arranged in a space formed by the foldable housing 210. In this document, a surface on which the display 220 is arranged is defined as a first surface or a front surface of the electronic device 200. In addition, a surface opposite the front surface is defined as a second surface or a rear surface of the electronic device 200. In addition, a surface encompassing the space between the front and rear surfaces is defined as a third surface or a side surface of the electronic device 200.

In an embodiment, the foldable housing 210 may include a first housing structure 211, a second housing structure 212 including a sensor area 215, a first rear cover 213, and a second rear cover 214. The foldable housing 210 of the electronic device 200 is not limited to the shape and combination shown in FIGS. 2A and 2B, and may be implemented by combining and/or coupling other shapes or components. For example, in another embodiment, the first housing structure 211 and the first rear cover 213 may be integrally formed, and the second housing structure 212 and the second rear cover 214 may be integrally formed.

In the illustrated embodiment, the first housing structure 211 and the second housing structure 212 may be arranged on both sides with respect to a folding axis (A axis), and may have a shape that is generally symmetric with respect to the folding axis A. As will be described later, the first housing structure 211 and the second housing structure 212 have different angles or distances therebetween depending on whether the electronic device 200 is in a folded state, an unfolded state, or an intermediate state. In the illustrated embodiment, unlike the first housing structure 211, the second housing structure 212 may additionally include the sensor area 215 in which various sensors are arranged, but in other areas, the second housing structure 212 may have a shape symmetrical to the first housing structure 211.

In an embodiment, as illustrated in FIG. 2A, the first housing structure 211 and the second housing structure 212 may form a recess for accommodating the display 220. In the illustrated embodiment, due to the sensor area 215, the recess may have two or more different widths in a direction perpendicular to the folding axis A.

For example, the recess may have (1) a first width w1 between a first portion 211a of the first housing structure 211 parallel to the folding axis A and a first portion 212a of the second housing structure 212 formed at the periphery of the sensor area 215, and (2) a second width w2 formed by a second portion 211b of the first housing structure 211 and a second portion 212b parallel to the folding axis A while not corresponding to the sensor area 215 of the second housing structure 212. In this case, the second width w2 may be formed longer than the first width w1. In other words, the first portion 211a of the first housing structure 211 and the first portion 212a of the second housing structure 212 having a mutually asymmetric shape may form the first width w1 of the recess, and the second portion 211b of the first housing structure 211 and the second portion 212b of the second housing structure 212 having a mutually symmetrical shape may form the second width w2 of the recess. In an embodiment, the first portion 212a and the second portion 212b of the second housing structure 212 may have a mutually different distance from the folding axis A. The width of the recess is not limited to the illustrated example. In various embodiments, the recess may have a plurality of widths due to the shape of the sensor area 215 or a portion having the asymmetric shape of the first housing structure 211 and the second housing structure 212.

In an embodiment, at least a portion of the first housing structure 211 and the second housing structure 212 may be made of a metal material or a non-metal material having a rigidity selected to support the display 220.

In an embodiment, the sensor area 215 may be formed to have a predetermined area adjacent to one corner of the second housing structure 212. However, the arrangement, shape, and size of the sensor area 215 are not limited to the illustrated example. For example, in another embodiment, the sensor area 215 may be provided at another corner of the second housing structure 212 or an arbitrary area between the upper and lower corners. In an embodiment, components for performing various functions embedded in the electronic device 200 may be exposed to the front surface of the electronic device 200 through the sensor area 215 or one or more openings provided in the sensor area 215. In various embodiments, the components may include various types of sensors. The sensor may include, for example, at least one of a front camera, a receiver, and a proximity sensor.

The first rear cover 213 may be arranged on one side of the folding axis on the rear surface of the electronic device 200. The first rear cover 213 may have, for example, a substantially rectangular periphery, and the periphery may be wrapped by the first housing structure 211. Similarly, the second rear cover 214 may be arranged on the other side of the folding axis on the rear surface of the electronic device, and the periphery of the second rear cover 214 may be wrapped by the second housing structure 212.

In the illustrated embodiment, the first rear cover 213 and the second rear cover 214 may have substantially symmetrical shapes with respect to the folding axis (A axis). However, the first rear cover 213 and the second rear cover 214 do not necessarily have mutually symmetrical shapes, and in another embodiment, the electronic device 200 may include the first rear cover 213 and the second rear cover 214 which have various shapes. In another embodiment, the first rear cover 213 may be integrally formed with the first housing structure 211, and the second rear cover 214 may be integrally formed with the second housing structure 212.

In an embodiment, the first rear cover 213, the second rear cover 214, the first housing structure 211, and the second housing structure 212 may form a space in which various components (e.g., a printed circuit board (PCB) or a battery) of the electronic device 200 can be arranged. In an embodiment, one or more components may be arranged or visually exposed on the rear surface of the electronic device 200. For example, at least a portion of a subdisplay 224 may be visually exposed through a first rear area 241a of the first rear cover 213. In another embodiment, one or more components or sensors may be visually exposed through a second rear area 242a of the second rear cover 214. In various embodiments, the sensor may include a proximity sensor and/or a rear camera.

Referring to FIG. 2B, the hinge cover 230 may be arranged between the first housing structure 211 and the second housing structure 212 and may be configured to cover an internal component (e.g., a hinge structure). In an embodiment, the hinge cover 230 may be covered by a part of the first housing structure 211 and the second housing structure 212 or may be exposed to the outside, depending on the state (flat state or folded state) of the electronic device 200.

For example, as illustrated in FIG. 2A, when the electronic device 200 is in an unfolded (flat) state, the hinge cover 230 may not be exposed by being covered by the first housing structure 211 and the second housing structure 212. For example, as shown in FIG. 2B, when the electronic device 200 is in a folded state (e.g., a fully folded state), the hinge cover 230 may be exposed to the outside between the first housing structure 211 and the second housing structure 212. For example, when the first housing structure 211 and the second housing structure 212 are in an intermediate state in which they are folded with a certain angle, the hinge cover 230 may be partially exposed to the outside between the first housing structure 211 and the second housing structure 212. However, in this case, the exposed area may be less than that in the fully folded state. In an embodiment, the hinge cover 230 may include a curved surface.

The display 220 may be arranged on a space formed by the foldable housing 210. For example, the display 220 may be seated on a recess formed by the foldable housing 210 and may constitute most of the front surface of the electronic device 200.

Accordingly, the front surface of the electronic device 200 may include the display 220 and partial areas of the first and second housing structures 211 and 212 adjacent to the display 220. Further, the rear surface of the electronic device 200 may include the first rear cover 213, a partial area of the first housing structure 211 adjacent to the first rear cover 213, the second rear cover 214, and a partial area of the second housing structure 212 adjacent to the second rear cover 214.

The display 220 may refer to a display of which at least a portion can be transformed into a flat or curved surface. In an embodiment, the display 220 may include a folding area 223, a first area 221 arranged on one side (left side of the folding area 223 illustrated in FIG. 2A) with respect to the folding area 223, and a second area 222 arranged on the other side (right side of the folding area 223 illustrated in FIG. 2A).

The division of the area of the display 220 illustrated in FIG. 2A is exemplary, and the display 220 may be divided into a plurality of (e.g., four or more or two) areas according to the structure or function thereof. For example, in the embodiment illustrated in FIG. 2A, the area of the display 220 may be divided by the folding area 223 extending parallel to the y-axis or the folding axis (A-axis), but in another embodiment, the area of the display 220 may be divided with respect to another folding area (e.g., a folding area parallel to the x-axis) or another folding axis (e.g., a folding axis parallel to the x-axis).

The first area 221 and the second area 222 may have a shape that is generally symmetrical to each other around the folding area 223. However, unlike the first area 221, the second area 222 may include a notch that is cut according to the presence of the sensor area 215, but in the other areas, the second area 222 may have a shape symmetrical to the first area 221. In other words, the first area 221 and the second area 222 may include a portion having a shape symmetrical to each other and a portion having a shape asymmetrical to each other.

Hereinafter, the operation of the first housing structure 211 and the second housing structure 212 according to the state (e.g., unfolded state (flat state) and folded state) of the electronic device 200, and each of the areas of the display 220 will be described.

In an embodiment, when the electronic device 200 is in the flat state (e.g., the state of FIG. 2A), the first housing structure 211 and the second housing structure 212 may be arranged to face the same direction while forming an angle of 180 degrees. The surface of the first area 221 and the surface of the second area 222 of the display 220 may form 180 degrees therebetween, and may face the same direction (e.g., the front direction of the electronic device). The folding area 223 may form the same plane as the first area 221 and the second area 222.

In an embodiment, when the electronic device 200 is in the folded state (e.g., the state of FIG. 2B), the first housing structure 211 and the second housing structure 212 may be arranged to face each other. The surface of the first area 221 and the surface of the second area 222 of the display 220 form a narrow angle (e.g., between 0 and 10 degrees) therebetween and may face each other. At least a portion of the folding area 223 may be formed as a curved surface having a predetermined curvature.

In an embodiment, when the electronic device 200 is in an intermediate state, the first housing structure 211 and the second housing structure 212 may be arranged at a certain angle therebetween. The surface of the first area 221 and the surface of the second area 222 of the display 220 may form an angle that is larger than that in the folded state and smaller than that in the unfolded state. At least a part of the folding area 223 may be formed of a curved surface having a predetermined curvature, and the curvature at this time may be smaller than that in the folded state.

Referring to FIG. 2C, in an embodiment, the electronic device 200 may include a display unit 250, a bracket assembly 260, a substrate unit 270, the first housing structure 211, the second housing structure 212, the first rear cover 213, and the second rear cover 214. In this document, the display unit 250 may be referred to as a display module or a display assembly.

The display unit 250 may include the display 220 and one or more plates or layers 251 on which the display 220 is seated. In an embodiment, the plate 251 may be disposed between the display 220 and the bracket assembly 260. The display 220 may be arranged on at least a portion of one surface (e.g., an upper surface based on FIG. 2C) of the plate 251. The plate 251 may be formed in a shape corresponding to the display 220. For example, a partial area of the plate 251 may be formed in a shape corresponding to the notch 225 of the display 220.

The bracket assembly 260 may include a first bracket 261, a second bracket 262, a hinge structure 264 disposed between the first bracket 261 and the second bracket 262, a hinge cover 230 that covers the hinge structure 264 as viewed from the outside, and a wiring member 263 (e.g., a flexible printed circuit board (FPCB)) that crosses the first bracket 261 and the second bracket 262.

In an embodiment, the bracket assembly 260 may be disposed between the plate 251 and the substrate unit 270. For example, the first bracket 261 may be disposed between the first area 221 of the display 220 and a first substrate 271 (e.g., a PCB). The second bracket 262 may be disposed between the second area 222 of the display 220 and a second substrate 272 (e.g., a PCB).

In an embodiment, at least a part of the wiring member 263 and the hinge structure 264 may be arranged inside the bracket assembly 260. The wiring member 263 may be arranged in a direction (e.g., in the x-axis direction) crossing the first bracket 261 and the second bracket 262. The wiring member 263 may be arranged in a direction (e.g., the x-axis direction) perpendicular to the folding axis (e.g., the y-axis or folding axis A of FIG. 2A) of the folding area 223 of the electronic device 200.

As mentioned above, the substrate unit 270 may include a first substrate 271 arranged at the side of the first bracket 261 and a second substrate 272 arranged at the side of the second bracket 262. The first substrate 271 and the second substrate 272 may be arranged inside a space formed by the bracket assembly 260, the first housing structure 211, the second housing structure 212, the first rear cover 213, and the second rear cover 214. Components for implementing various functions of the electronic device 200 may be mounted on the first substrate 271 and the second substrate 272.

The first housing structure 211 and the second housing structure 212 may be assembled with each other so as to be coupled to both sides of the bracket assembly 260 in a state in which the display unit 250 is coupled to the bracket assembly 260. As will be described later, the first housing structure 211 and the second housing structure 212 may slide on both sides of the bracket assembly 260 to be coupled to the bracket assembly 260.

In an embodiment, the first housing structure 211 may include a first rotational support surface 211c, and the second housing structure 212 may include a second rotational support surface 212c corresponding to the first rotational support surface 211c. Each of the first rotational support surface 211c and the second rotational support surface 212c may include a curved surface corresponding to the curved surface included in the hinge cover 230.

In an embodiment, when the electronic device 200 is in the unfolded state (e.g., the state of FIG. 2A), the first rotational support surface 211c and the second rotational support surface 212c may cover the hinge cover 230, so that the hinge cover 230 may not be exposed to the rear surface of the electronic device 200 or may be minimally exposed. On the other hand, when the electronic device 200 is in the folded state (e.g., the state of FIG. 2B), the first rotational support surface 211c and the second rotational support surface 212c may rotate along the curved surface included in the hinge cover 230 so that the hinge cover 230 can be maximally exposed to the rear surface of the electronic device 200.

Figure 3:
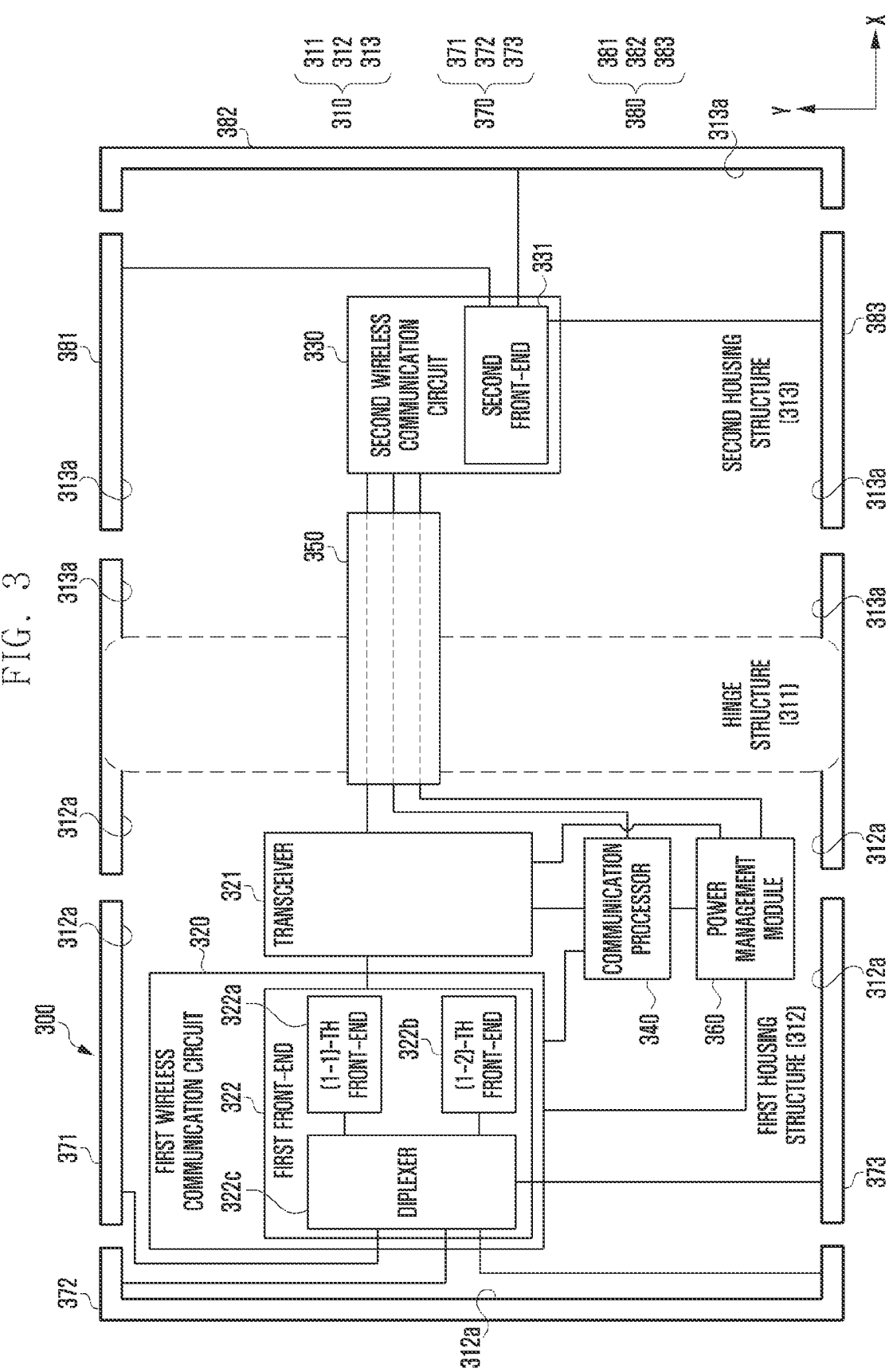
FIG. 3 is a diagram illustrating an arrangement structure of wireless communication circuits supporting the same type of wireless communication in a foldable electronic device according to various embodiments of the disclosure.

FIG. 3 is a diagram illustrating an arrangement structure of wireless communication circuits supporting the same type of wireless communication in a foldable electronic device according to various embodiments of the disclosure. Referring to FIG. 3, an electronic device 300 (e.g., the electronic device 200 of FIG. 2) may include at least one of a foldable housing 310, a first wireless communication circuit 320, a transceiver 321, a second wireless communication circuit 330, a communication processor 340, a wiring member 350, and a power management module 360.

An electronic device (e.g., the electronic device 200 of FIG. 2A) that can be folded and unfolded left/right with respect to a first folding axis (e.g., Y axis) may be referred to as a horizontal foldable device, and a device that can be folded and unfolded up/down with respect to a second folding axis (e.g., X axis) perpendicular to the first folding axis may be referred to as a vertical foldable device. Components of FIG. 3 and an arrangement structure of the components which will be described later may be substantially equally applied regardless of the vertical type/horizontal type.

According to various embodiments, the foldable housing 310 (e.g., the foldable housing 210 of FIG. 2) may include a hinge structure 311, a first housing structure 312, and/or a second housing structure 313. For example, the hinge structure 311 may include the bracket assembly 260 of FIG. 2C. The first housing structure 312 may include the first housing structure 211 and the first rear cover 213 of FIG. 2C. The second housing structure 313 may include the second housing structure 212 and the second rear cover 214 of FIG. 2C.

According to various embodiments, the first housing structure 312 may be connected to the hinge structure 311, and may include a first surface facing a first direction (e.g., the surface on which the first area 221 is arranged in the display 220 of FIG. 2C), a second surface facing a second direction opposite the first direction (e.g., the surface exposed in the second direction on the first rear cover 213 of FIG. 2C), and/or a first side member 312a (e.g., the first housing structure 211 of FIG. 2C) that encompasses at least a portion of the space between the first surface and the second surface. The first side member 312a may include at least one first conductive part 370 as a radiator. For example, the first conductive part 370 may include at least one of a (1-1)-th conductive part 371, a (1-2)-th conductive part 372, and/or a (1-3)-th conductive part 373.

According to various embodiments, the second housing structure 313 may be connected to the hinge structure 311, and may include a third surface facing a third direction (e.g., the surface on which the second area 222 is arranged in the display 220 of FIG. 2C), a fourth surface facing a fourth direction opposite the third direction (e.g., the surface exposed in the fourth direction on the second rear cover 214 of FIG. 2C), and/or a second side member 313a (e.g., the second housing structure 212 of FIG. 2C) that encompasses at least a portion of the space between the third surface and the fourth surface. The second side member 313a may include at least one second conductive part 380 as a radiator. For example, the second conductive part 380 may include at least one of a (2-1)-th conductive part 381, a (2-2)-th conductive part 382, and/or a (2-3)-th conductive part 383.

According to various embodiments, when the foldable housing 310 is in a folded state (e.g., the state of FIG. 2B), the first surface and the third surface may be arranged to face each other. When the foldable housing 310 is in an unfolded state (e.g., the state of FIG. 2A), the third direction and the first direction may be the same.

According to various embodiments, the communication processor 340 may be arranged inside the first housing structure 312. For example, the communication processor 340 may be the processor 120 of FIG. 1 (e.g., the main processor 121 or the auxiliary processor 123) or a communication processor included in the communication module 190, and may be mounted on a first substrate (e.g., the first substrate 271 of FIG. 2C) arranged inside the first housing structure 312.

According to various embodiments, the communication processor 340 may control the first wireless communication circuit 320 to transmit and/or receive a signal having a designated first frequency (e.g., a middle band frequency in LTE and/or an LTE high band frequency).

According to various embodiments, the communication processor 340 may control the second wireless communication circuit 330 to transmit and/or receive a signal having a designated second frequency (e.g., an LTE low band frequency).

According to various embodiments, the first wireless communication circuit 320 (e.g., one of the plurality of wireless communication circuits included in the communication module 190 of FIG. 1) may be arranged inside the first housing structure 312. For example, the first wireless communication circuit 320 may be mounted on a first substrate (e.g., the first substrate 271 of FIG. 2C) arranged in the first housing structure 312.

According to various embodiments, the first wireless communication circuit 320 may be electrically connected to at least some of the first conductive parts 370 and the communication processor 340. For example, the first wireless communication circuit 320 may be electrically connected to the first conductive parts 370 (e.g., the (1-1)-th conductive part 371 and the (1-2)-th conductive part 372) through a conductive connection member such as a feeding wiring line or a terminal (e.g., C-clip). The first wireless communication circuit 320 may be electrically connected to the communication processor 340 through a wiring line formed on the first substrate.

According to various embodiments, the first wireless communication circuit 320 may transmit a first signal having a first frequency to the first conductive part 370 and may receive the first signal from the first conductive part 370 under the control of the communication processor 340. For example, the first wireless communication circuit 320 may receive a control signal from the communication processor 340 through the wiring line formed on the first substrate, and may adjust the gain (e.g., a ratio of "power of output signal" to "power of input signal") and/or phase of the first signal to be processed by the control signal.

According to various embodiments, the second wireless communication circuit 330 (e.g., one of the plurality of wireless communication circuits included in the communication module 190 of FIG. 1) may be arranged inside the second housing structure 313. For example, the second wireless communication circuit 330 may be mounted on a second substrate (e.g., the second substrate 272 of FIG. 2C) arranged inside the second housing structure 313.

According to various embodiments, the second wireless communication circuit 330 may be electrically connected to the second conductive part 380, the first wireless communication circuit 320, and the communication processor 340. For example, the second wireless communication circuit 330 may be electrically connected to the second conductive parts 380 (e.g., the (2-1)-th conductive part 381) through a conductive connection member such as a feeding wiring line or a terminal. The second wireless communication circuit 330 may be electrically connected to the first wireless communication circuit 320 and the communication processor 340 through the wiring member 350 (e.g., the wiring member 263 of FIG. 2C).

According to various embodiments, the second wireless communication circuit 330 may transmit a second signal having a second frequency to the second conductive part 380 and may receive the second signal from the second conductive part 380 under the control of the communication processor 340. For example, the second wireless communication circuit 330 may receive a control signal from the communication processor 340 through the wiring member 350, and may adjust the gain and/or phase of the second signal to be processed by the control signal.

According to an embodiment, the first wireless communication circuit 320 may include a first front-end 322. The second wireless communication circuit 330 may include a second front-end 331. The transceiver 321 may demodulate a signal (e.g., a radio frequency (RF) signal or an intermediate frequency (IF) signal) received from the first front-end 322 into a signal (e.g., a baseband signal) that can be processed by the communication processor 340, and may transmit the demodulated signal to the communication processor 340. The transceiver 321 may modulate a signal received from the communication processor 340 into a signal that can be processed by the first front-end 322, and may transmit the modulated signal to the first front-end 322. The transceiver 321 may modulate a signal (e.g., an RF signal or an IF signal) received from the second front-end 331 through the wiring member 350 into a signal that can be processed by the communication processor 340, and may transmit the modulated signal to the communication processor 340. The transceiver 321 may modulate a signal received from the communication processor 340 into a signal that can be processed by the second front-end 331 and may transmit the modulated signal to the second front-end 331 through the wiring member 350.

When a signal flows through the wiring member 350, a parasitic component (e.g., a resistance component caused by the skin effect and an inductance component caused by the self-inductance of a conductor when a signal flows through the conductor) may be generated, and the parasitic component may cause power loss or distortion of the signal flowing through the conductor. According to an embodiment, the physical length of the wiring member 350 may be designed to be as short as possible in order to reduce the power loss or distortion caused by the parasitic component. For example, the transceiver 321 and the second front-end 331 may be arranged as close to the hinge structure 311 as possible, so that the physical length of the wiring member 350 may be designed to be as short as possible. The wiring member 350 may include an FPCB and/or a coaxial cable.

According to an embodiment, the wiring member 350 may extend from the first housing structure 312 to the second housing structure 313 across the hinge structure 311, the transceiver 321 may be electrically connected to one end of the wiring member 350, and the second front-end 331 may be electrically connected to the other end of the wiring member 350.

According to various embodiments, the first front-end 322 may be electrically connected to the (1-1)-th conductive part 371, the (1-2)-th conductive part 372, and/or the (1-3)-th conductive part 373 and the transceiver 321, may process an RF signal received from the (1-1)-th conductive part 371, the (1-2)-th conductive part 372, and/or the (1-3)-th conductive part 373 to transmit the processed RF signal to the transceiver 321, and may process a signal (e.g., an RF signal or an IF signal) received from the transceiver 321 to transmit the processed signal to the (1-1)-th conductive part 371, the (1-2)-th conductive part 372, and/or the (1-3)-th conductive part 373. The second front-end 331 may be electrically connected to the (2-1)-th conductive part 381, the (2-2)-th conductive part 382, and/or the (2-3)-th conductive part 383 and the transceiver 321, may process an RF signal received from the (2-1)-th conductive part 381, the (2-2)-th conductive part 382, and/or the (2-3)-th conductive part 383 to transmit the processed RF signal to the transceiver 321, and may process a signal (e.g., an RF signal or an IF signal) received from the transceiver 321 to transmit the processed signal to the (2-1)-th conductive part 381, the (2-2)-th conductive part 382, and/or the (2-3)-th conductive part 383.

According to an embodiment, the first front-end 322 and the second front-end 331 may respectively include a transmission circuit, a reception circuit, and a switch circuit for changing the operation mode of the corresponding front-end from reception to transmission or vice versa. The transmission circuit may include, for example, at least one amplifying circuit (e.g., a driver amplifier and/or a power amplifier) that amplifies an RF signal received from the transceiver 321 and outputs the amplified RF signal to the corresponding conductive part. When the signal received from the transceiver 321 is an IF signal, the transmission circuit may further include a mixer that mixes the IF signal with a designated local oscillator (LO) signal to up-convert the mixed signal to a designated RF frequency and outputs the RF signal to the amplifying circuit. The reception circuit may include, for example, at least one amplifying circuit (e.g., a low noise amplifier or a variable gain amplifier) that amplifies the RF signal received from the corresponding conductive part and outputs the amplified signal to the transceiver 321. When the signal that can be processed by the transceiver 321 is an IF signal, the reception circuit may further include a mixer that mixes the amplified RF signal with a designated LO signal to down-convert the mixed signal to a designated IF frequency and outputs the IF signal to the transceiver 321. The switch circuit of the first front-end 322 may receive a control signal from the communication processor 340 through a wiring line formed on the first substrate, and may allow one of the transmission circuit and the reception circuit to be connected to the first conductive part 370 by the control signal. The LO signal may be transmitted from the communication processor 340 to the first front-end 322 through, for example, the wiring line formed on the first substrate. The switch circuit of the second front-end 331 may receive a control signal from the communication processor 340 through, for example, the wiring member 350, and may allow one of the transmission circuit and the reception circuit to be connected to the second conductive part 380 by the control signal. The LO signal may be transmitted from the communication processor 340 to the second front-end 331 through, for example, the wiring member 350.

As an index indicating how much noise increases as a signal received through an antenna passes through a conductive wire, an amplifier, and/or a filter, for example, a noise factor (F) represents a ratio of an output signal to noise ratio (SNR) to an input SNR, and a noise figure (NF) is obtained by expressing F in dB scale. Equation 1 below is a formula for obtaining NF at a final output terminal "N" when N devices are connected to an antenna in a cascade manner. In Equation 1 below, G denotes the gain of the corresponding device. According to Equation 1, a power loss in a conductive wire connecting the antenna and the reception circuit may be a major determinant of the total NF. According to various embodiments, in each reception circuit of the first front-end 322 and the second front-end 331, a device (e.g., a low noise amplifier) that first receives a signal may be arranged adjacent to the corresponding antenna, thereby reducing noise in the signal.

[Equation 1]

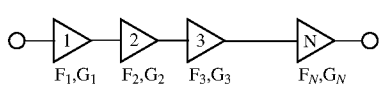

$$F = F_1 + \frac{F_2 - 1}{G_1} + \frac{F_3 - 1}{G_1 G_2} + \ldots + \frac{F_N - 1}{G_1 G_2 \ldots G_{N-1}} NF = 10 \log F$$

According to various embodiments, each transmission circuit (e.g., power amplifier) of the first front-end 322 and the second front-end 331 may be arranged adjacent to the corresponding antenna in order to reduce the physical length of a connection member connecting the antenna and the transmission circuit. Accordingly, power loss or distortion of a transmission signal can be reduced.

According to various embodiments, the first front-end 322 may support wireless communication in various frequency bands. According to an embodiment, the first front-end 322 may include: a (1-1)-th front-end 322a that supports wireless communication of a first frequency band (e.g., an LTE high-band frequency); a (1-2)-th front-end 322b that supports wireless communication of a second frequency band (e.g., a band frequency in LTE); and/or a diplexer 322c that filters a signal in the first frequency band (e.g., between 2.3 GHz and 2.7 GHz) from an RF signal (e.g., an RF signal having a frequency between about 600 MHz and about 4 GHz) received by the first conductive part 370 and transmits the filtered signal to the (1-1)-th front-end 322a, and filters a signal in the second frequency band (e.g., frequency between 1.7 GHz and 2.1 GHz) and transmits the filtered signal to the (1-2)-th front-end 322b.

A parasitic component may increase as the frequency of a signal flowing through a conductive wire (e.g., the wiring member 350) increases. According to an embodiment, the second front-end 331 may support wireless communication in a frequency band lower than the frequency band supported by the first front-end 322. For example, when the first front-end 322 supports wireless communication in an LTE high frequency band and an intermediate frequency band, the second front-end 331 may support wireless communication in an LTE low frequency band (e.g., frequency between about 600 MHz and about 1 GHz). The second front-end 331 may further include a filter (not shown) (e.g., a low-pass filter) that filters a signal in a third frequency band (e.g., frequency between about 600 MHz and 1 GHz)  from an RF signal (e.g., an RF signal of a frequency between about 600 MHz and about 4 GHz) received by the second conductive part 380 and transmits the filtered signal to the corresponding reception circuit.

According to various embodiments, the power management module 360 (e.g., the power management module 188 of FIG. 1) may supply power to the first wireless communication circuit 320, the second wireless communication circuit 330, and/or the communication processor 340. For example, the power management module 360 may be mounted on a first substrate (e.g., the first substrate 271 of FIG. 2C) arranged inside the first housing structure 312. The power management module 360 may supply power to the first wireless communication circuit 320 and the communication processor 340 through a power wiring line formed on the first substrate, and may supply power to the second wireless communication circuit 330 through the wiring member 350.

Figure 4:
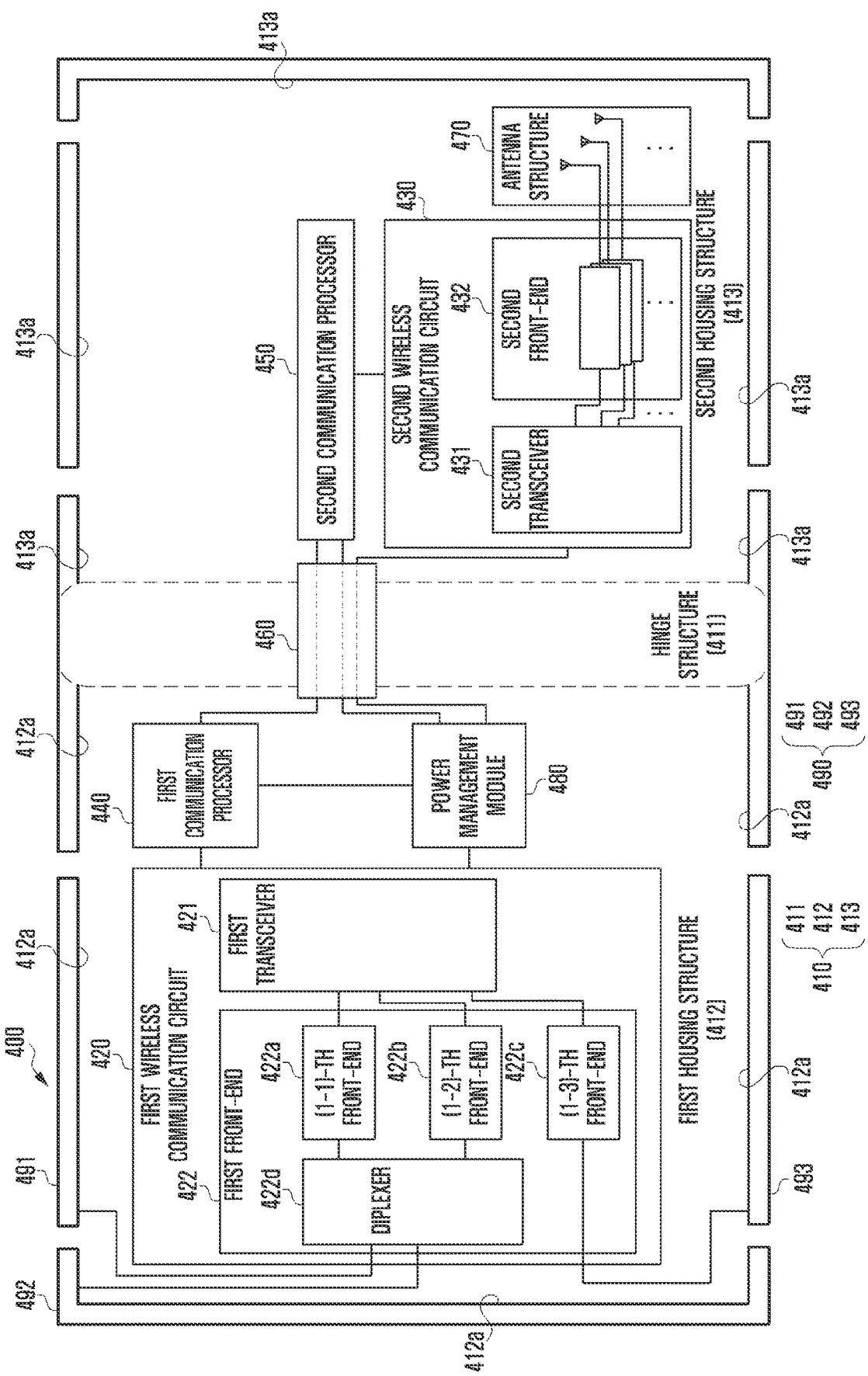
FIG. 4 is a diagram illustrating an arrangement structure of wireless communication circuits supporting different types of wireless communication in a foldable electronic device according to various embodiments of the disclosure.

FIG. 4 is a diagram illustrating an arrangement structure of wireless communication circuits supporting different types of wireless communication in a foldable electronic device according to various embodiments of the disclosure. Referring to FIG. 4, an electronic device 400 (e.g., the electronic device 200 of FIG. 2) may include a foldable housing 410, a first wireless communication circuit 420, a second wireless communication circuit 430, a first communication processor 440, a second communication processor 450, a wiring member 460, an antenna structure 470, and/or a power management module 480. At least one of the components of the electronic device 400 may be the same as or similar to at least one of the components of the electronic device 300 of FIG. 3, and redundant descriptions may be omitted below.

According to various embodiments, the foldable housing 410 (e.g., the foldable housing 210 of FIG. 2) may include a hinge structure 411, a first housing structure 412, and a second housing structure 413.

According to various embodiments, the first housing structure 412 may be connected to the hinge structure 411, and may include a first surface facing a first direction, a second surface facing a second direction opposite the first direction, and a first side member 412a that encompasses at least a portion of the space between the first surface and the second surface. The first side member 412a may include at least one of a first conductive part 491, a second conductive part 492, and/or a third conductive part 493 as radiators.

According to various embodiments, the second housing structure 413 may be connected to the hinge structure 411, and may include a third surface facing a third direction, a fourth surface facing a fourth direction opposite the third direction, and a second side member 413a that encompasses at least a portion of the space between the third surface and the fourth surface.

According to various embodiments, when the foldable housing 410 is in a folded state, the first surface and the third surface may be arranged to face each other. When the foldable housing 410 is in an unfolded state, the third direction and the first direction may be the same.

According to various embodiments, the first communication processor 440 may be, for example, the processor 120 of FIG. 1 arranged inside the first housing structure 412 or one of the plurality of communication processors included in the communication module 190 of FIG. 1, and may support first wireless communication (e.g., LTE communication). For example, the first communication processor 440 may control the first wireless communication circuit 420 to transmit and/or receive a signal having a designated first frequency (e.g., a frequency between about 600 MHz and about 3 GHz).

According to various embodiments, the second communication processor 450 may be, for example, one of a plurality of communication processors, which is included in the communication module of FIG. 1, arranged inside the second housing structure 413, and may support second wireless communication (e.g., 5G communication) different from the first wireless communication. According to an embodiment, the second communication processor 450 may control the second wireless communication circuit 430 to transmit and/or receive a signal having a designated second frequency (e.g., a high frequency (mmwave) between about 3 GHz and about 100 GHz). For example, the second communication processor 450 may receive a control signal from the first communication processor 440 through the wiring member 460, and may control wireless communication of the second wireless communication circuit 430 by the control signal. According to an embodiment, the second communication processor 450 may receive a signal (e.g., a baseband signal) to be processed by the second wireless communication circuit 430 from the first communication processor 440 through the wiring member 460, and may transmit the signal processed by the second wireless communication circuit 430 to the first communication processor 440 through the wiring member 460.

According to various embodiments, the first wireless communication circuit 420 may be, for example, at least one wireless communication circuit that can support first wireless communication among the plurality of wireless communication circuits included in the communication module 190, which is arranged inside the first housing structure 412, and may be electrically connected to the first conductive part 490 and the first communication processor 440. The first wireless communication circuit 420 may transmit a first signal having a first frequency to the first conductive part 490 and may receive the first signal from the first conductive part 490, under the control of the first communication processor 440.

According to various embodiments, the second wireless communication circuit 430 may be, for example, at least one wireless communication circuit that can support second wireless communication among the plurality of wireless communication circuits included in the communication module 190, which is arranged inside the second housing structure 413, and may be electrically connected to the antenna structure 470 and the second communication processor 450. The second wireless communication circuit 430 may transmit a second signal having a second frequency to the antenna structure 470 and may receive the second signal from the antenna structure 470, under the control of the second communication processor 450.

According to an embodiment, the first wireless communication circuit 420 may be obtained by integrating the first wireless communication circuit 320 of FIG. 3 and the second wireless communication circuit 330 of FIG. 3 into one component (e.g., a single chip) and may be arranged in the first housing structure 412. For example, in the first wireless communication circuit 420, the first transceiver 421 may be the transceiver 321 of FIG. 3. In the first front-end 422 of the first wireless communication circuit 420, a (1-1)-th front-end 422a may be the (1-1)-th front-end 322a of FIG. 3, the (1-2)-th front-end 422b may be the (1-2)-th front-end 322b of FIG. 3, the (1-3)-th front-end 422c may be the second front-end 331 of FIG. 3, and the diplexer 422d may be the diplexer 322c of FIG. 3.

According to various embodiments, the second wireless communication circuit 430 may include a second transceiver 431 and/or a second front-end 432. For example, the second transceiver 431 and the second front-end 432 may differ only in the supportable wireless communication methods (e.g., the first wireless communication circuit 420 supports LTE and the second wireless communication circuit 430 supports 5G), and may perform substantially the same functions as the first transceiver 421 and the first front-end 422.

According to various embodiments, the second front-end 432 may include a plurality of front-ends (e.g., 4, 8, 16, or 32 front-ends), and each of the front-ends may be connected to the antenna structure 470.

According to various embodiments, the antenna structure 470 may include a printed circuit board and one or more antenna elements (e.g., the same number of antenna elements as the number of front-ends) which are mounted on the printed circuit board and electrically connected to the second front-end 432.

According to various embodiments, the power management module 480 (e.g., the power management module 188 of FIG. 1) may supply power to the first wireless communication circuit 420, the second wireless communication circuit 430, the first communication processor 440, and/or the second communication processor 450. For example, the power management module 480 may be mounted on a first substrate (e.g., the first substrate 271 of FIG. 2C) arranged inside the first housing structure 412. The power management module 480 may supply power to the first wireless communication circuit 420 and the first communication processor 440 through a power wiring line formed on the first substrate, and may supply power to the second wireless communication circuit 430 and the second communication processor 450 through the wiring member 460.

Figure 5:
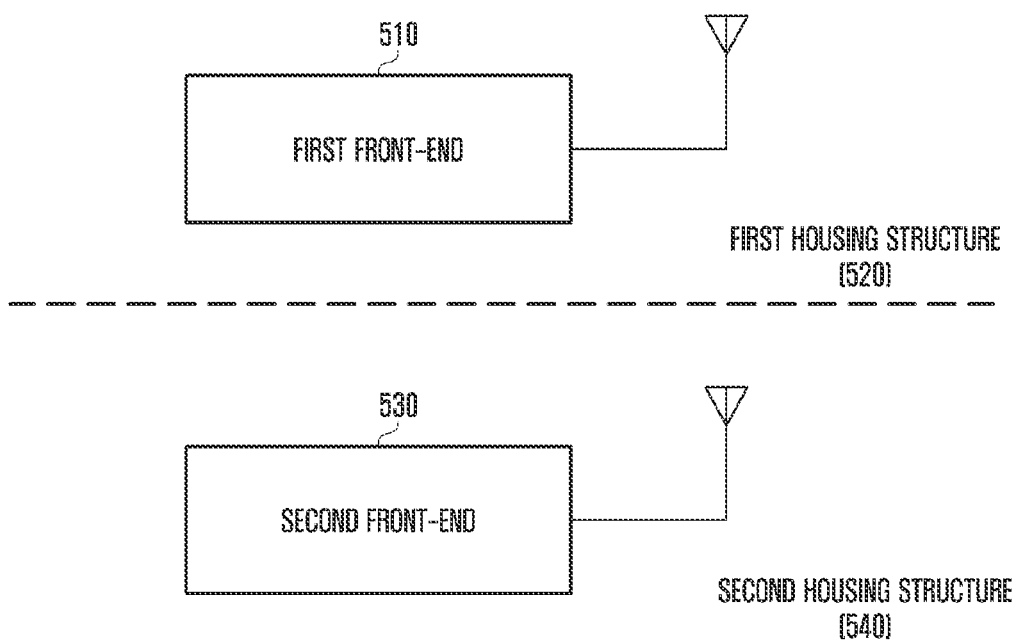
FIG. 5 is a diagram illustrating a state in which each of a first front end and a second front end is arranged in a different housing structure in a foldable electronic device according to various embodiments of the disclosure.

FIG. 5 is a diagram illustrating a state in which each of a first front-end and a second front-end is arranged in a different housing structure in a foldable electronic device according to various embodiments of the disclosure. Referring to FIG. 5, a first front-end 510 (e.g., the first front-end 422 in FIG. 4) may be located inside a first housing structure 520 (e.g., inside the space formed by the first housing structure 211 and the first rear cover 213 of FIG. 2). A second front-end 530 (e.g., the second front-end 432 in FIG. 4) may be located inside a second housing structure 540 (e.g., inside the space formed by the second housing structure 212 and the second rear cover 214 of FIG. 2).

When the second front-end 530 processes and transmits a 5G signal, intermodulation (e.g., hereinafter, collectively referred to as noise) such as second order intermodulation distortion (IMD2) due to noise, harmonics, and a combination of harmonics may occur, and if such noise is mixed with an LTE signal received by the first front-end 510, deterioration in the LTE reception performance may be caused. Alternatively, when the first front-end 510 processes and transmits an LTE signal, noise may occur, and if such noise is mixed with a 5G signal received by the second front-end 530, deterioration in the 5G reception performance may be caused.

According to various embodiments, since the first front-end 510 and the second front-end 530 are respectively arranged in a different housing structure, isolation between the two front-ends can be ensured. For this reason, noise that causes deterioration in the reception performance can be prevented from flowing into the reception signal, and different wireless communication methods (e.g., LTE and 5G) can coexist in one device.

According to various embodiments, in addition to the first front-end 510, a third front-end (e.g., a front-end of a GNSS communication module) may be located in the first housing structure 520. Accordingly, deterioration in the reception performance of the third front-end may be prevented by isolation between the third front-end and the second front-end 530.

Figure 6:
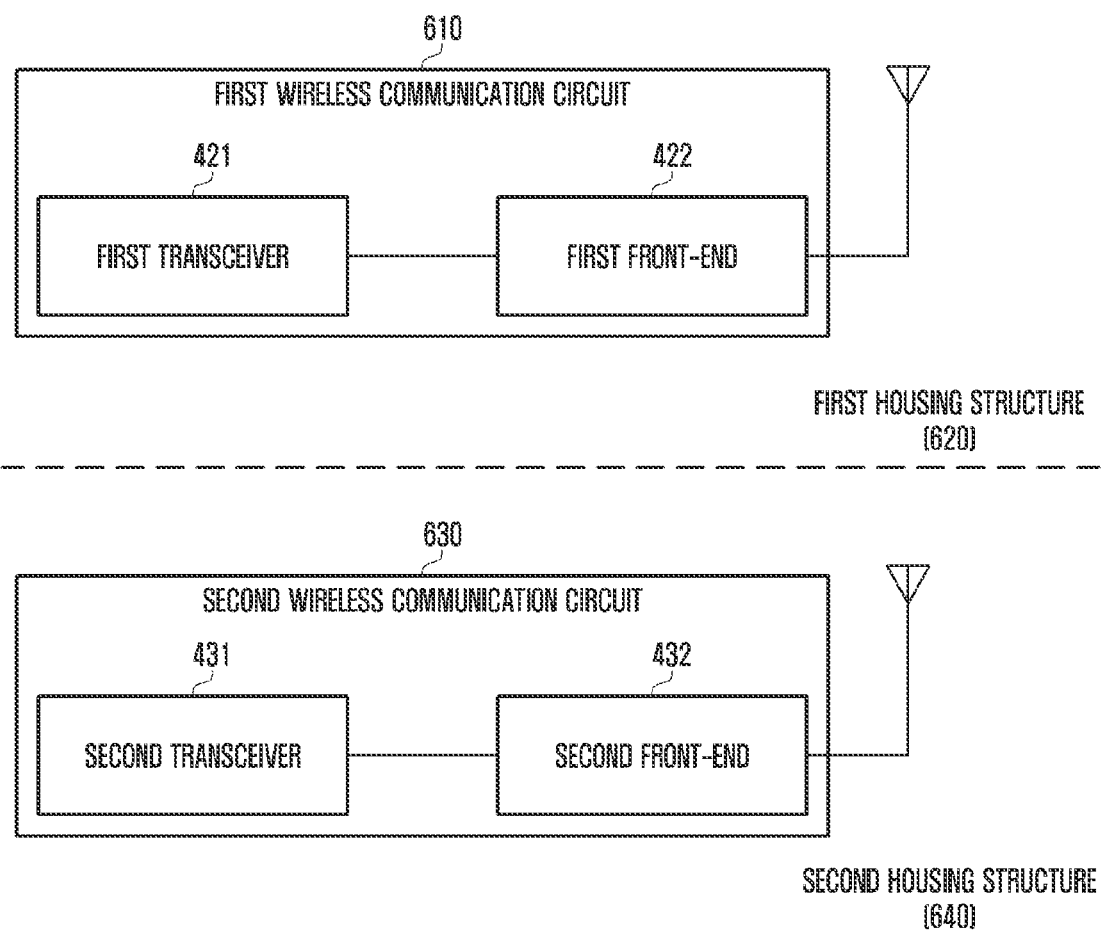
FIG. 6 is a diagram illustrating a state in which each of a first wireless communication circuit and a second wireless communication circuit is arranged in a different housing structure in a foldable electronic device according to various embodiments of the disclosure.

FIG. 6 is a diagram illustrating a state in which each of a first wireless communication circuit and a second wireless communication circuit is arranged in a different housing structure in a foldable electronic device according to various embodiments of the disclosure. Referring to FIG. 6, a first wireless communication circuit 610 may include the first transceiver 421 and/or the first front-end 422 of FIG. 4, and may be located inside the first housing structure 620 (e.g., inside the space formed by the first housing structure 211 and the first rear cover 213 of FIG. 2). The second wireless communication circuit 630 may include the second transceiver 431 and/or the second front-end 432 of FIG. 4, and may be located inside the second housing structure 640 (e.g., inside the space formed by the second housing structure 212 and the second rear cover 214 of FIG. 2).

According to various embodiments, since the first wireless communication circuit 610 and the second wireless communication circuit 620 are respectively arranged in a different housing structure, isolation between the two wireless communication circuits can be ensured, and thus different wireless communication methods (e.g., LTE and 5G) can secure the performance in one device.

According to various embodiments, in addition to the first wireless communication circuit 610, a third wireless communication circuit (e.g., a GNSS communication module) may be located in the first housing structure 620. Accordingly, deterioration of reception performance of the third wireless communication circuit may be reduced due to isolation between the third wireless communication circuit and the second wireless communication circuit 640.

An electronic device (e.g., the electronic device 300 of FIG. 3) according to various embodiments of the disclosure may include: a foldable housing (e.g., the foldable housing 310 of FIG. 3) configured to include a hinge structure (e.g., the hinge structure 311 of FIG. 3), a first housing structure (e.g., the first housing structure 312 of FIG. 3) connected to the hinge structure and including a first surface facing a first direction, a second surface facing a second direction opposite the first direction, and a first side member (e.g., the first side member 312a of FIG. 3) that encompasses at least a portion of the space between the first and second surfaces and includes at least one first conductive part, and a second housing structure (e.g., the second housing structure 313 of FIG. 3) connected to the hinge structure and including a third surface facing a third direction, a fourth surface facing a fourth direction opposite the third direction, and a second side member (e.g., the second side member 313a of FIG. 3) that encompasses at least a portion of the space between the third and fourth surfaces and includes at least one second conductive part, the second housing structure (e.g., the second housing structure 313 of FIG. 3) brought into contact with the first housing structure with respect to the hinge structure as the center thereof, wherein the first surface faces the third surface in a folded state and the third direction is the same as the first direction in an unfolded state; a flexible display (e.g., the display 220 of FIG. 2C) extending from the first surface to the third surface; a first communication processor (e.g., the communication processor 340 of FIG. 3) arranged inside the first housing structure; a first wireless communication circuit (e.g., the first wireless communication circuit 320 of FIG. 3) arranged inside the first housing structure, electrically connected to the first conductive part and the first communication processor, and configured to transmit and/or receive a first signal having a first frequency; and a second wireless communication circuit (e.g., the second wireless communication circuit 330 of FIG. 3) arranged inside the second housing structure, electrically connected to the second conductive part and the first communication processor, and configured to transmit and/or receive a second signal having a second frequency.

According to various embodiments, the first frequency may include a frequency between about 1 GHz and about 4 GHz, and the second frequency may include a frequency between about 600 MHz and about 1 GHz.

According to various embodiments, the electronic device may further include a flexible printed circuit board (FPCB) (e.g., the wiring member 350 of FIG. 3) that electrically connects the first communication processor and the second wireless communication circuit.

According to various embodiments, the first side member may be coupled to the second surface or integrally formed with the second surface, and the second side member may be coupled to the fourth surface or integrally formed with the fourth surface.

According to various embodiments, the FPCB may extend from the first housing structure to the second housing structure across the hinge structure.

According to various embodiments, the electronic device may further include a transceiver (e.g., the transceiver 321 of FIG. 3) arranged inside the first housing structure, electrically connected between the first wireless communication circuit and the first communication processor, and electrically connected between the FPCB and the first communication processor.

According to various embodiments, the first wireless communication circuit may receive the signal having the first frequency from the first communication processor through the transceiver, and may transmit the signal having the first frequency to the first communication processor through the transceiver. The second wireless communication circuit may be electrically connected to the transceiver through the FPCB, may receive the signal having the second frequency from the first communication processor through the FPCB and the transceiver, and may transmit the signal having the second frequency to the first communication processor through the FPCB and the transceiver.

According to various embodiments, the electronic device may further include a power management module (e.g., the power management module 360 of FIG. 3) arranged in the first housing structure, and power from the power management module may be supplied to the second wireless communication circuit through the FPCB.

According to various embodiments, the electronic device may further include an FPCB or a coaxial cable (e.g., the wiring member 350 of FIG. 3) that electrically connects the first wireless communication circuit and the second wireless communication circuit so that the signal having the second frequency is transmitted and/or received.

According to various embodiments, the FPCB or the coaxial cable may extend from the first housing structure to the second housing structure across the hinge structure.

According to various embodiments, the electronic device may further include a first printed circuit board (e.g., the first substrate 271 of FIG. 2C) arranged on the first housing structure, and a second printed circuit board (e.g., the second substrate 272 of FIG. 2C) arranged on the second housing structure. The first communication processor and the first wireless communication circuit may be mounted on the first printed circuit board, and the second wireless communication circuit may be mounted on the second printed circuit board.

An electronic device (e.g., the electronic device 400 of FIG. 4) according to various embodiments of the disclosure may include: a foldable housing (e.g., the foldable housing 410 of FIG. 4) configured to include a hinge structure (e.g., the hinge structure 411 of FIG. 4), a first housing structure (e.g., the first housing structure 412 of FIG. 4) connected to the hinge structure and including a first surface facing a first direction, a second surface facing a second direction opposite the first direction, and a first side member (e.g., the first side member 412*a* of FIG. 4) that encompasses at least a portion of the space between the first and second surfaces and includes at least one conductive part, and a second housing structure (e.g., the second housing structure 413 of FIG. 4) connected to the hinge structure, and including a third surface facing a third direction, a fourth surface facing a fourth direction opposite the third direction, and a second side member (e.g., the second side member 413*a* of FIG. 4) that encompasses at least a portion of the space between the third and fourth surfaces, the second housing structure (e.g., the second housing structure 413 of FIG. 4) brought into contact with the first housing structure with respect to the hinge structure as the center thereof, wherein the first surface faces the third surface in a folded state and the third direction is the same as the first direction in an unfolded state; a flexible display (e.g., the display 220 of FIG. 2C) extending from the first surface to the third surface; a first communication processor (e.g., the first communication processor 440 of FIG. 4) arranged inside the first housing structure; a second communication processor (e.g., the second communication processor 450 of FIG. 4) arranged inside the second housing structure and electrically connected to the first communication processor; a first wireless communication circuit (e.g., the first wireless communication circuit 420 of FIG. 4) arranged inside the first housing structure, electrically connected to the conductive part and the first communication processor, and configured to transmit and/or receive a first signal having a first frequency; an antenna structure (e.g., the antenna structure 470 of FIG. 4) arranged inside the second housing structure and including a printed circuit board and at least one antenna element; and a second wireless communication circuit (e.g., the second wireless communication circuit 430 of FIG. 4) electrically connected to the antenna element and the second communication processor and configured to transmit and/or receive a second signal having a second frequency.

According to various embodiments, the first frequency may include a frequency between about 600 MHz and about 3 GHz, and the second frequency may include a frequency between about 3 GHz and about 100 GHz.

According to various embodiments, the first side member may be coupled to the second surface or integrally formed with the second surface, and the second side member may be coupled to the fourth surface or integrally with the fourth surface.

According to various embodiments, the electronic device may further include an FPCB (e.g., the wiring member 460 of FIG. 4) that electrically connects the first communication processor and the second communication processor.

According to various embodiments, the FPCB may extend from the first housing structure to the second housing structure across the hinge structure.

According to various embodiments, the electronic device may further include a power management module (e.g., the power management module 480 of FIG. 4) arranged in the first housing structure, and the power of the power management module may be supplied to the second communication processor and the second wireless communication circuit through the FPCB.

According to various embodiments, the second communication processor may receive a signal to be processed by the second wireless communication circuit from the first communication processor through the FPCB, and may transmit the signal processed by the second wireless communication circuit to the first communication processor through the FPCB.

According to various embodiments, the first wireless communication circuit may include a first transceiver (e.g., the first transceiver 421 of FIG. 4) and a first front-end (e.g., the first front-end 422 of FIG. 4), and the second wireless communication circuit may include a second transceiver (e.g., the second transceiver 431 of FIG. 4) and a second front-end (e.g., the second front-end 432 of FIG. 4). The first front-end may process a signal received from the first conductive part to transmit the processed signal to the first transceiver, and may process a signal received from the first transceiver to transmit the processed signal to the conductive part. The second front-end may process a signal received from the antenna structure to transmit the processed signal to the second transceiver, and may process a signal received from the second transceiver to transmit the processed signal to the antenna structure. The first transceiver may demodulate a signal received from the first front-end into a signal that can be processed by the first communication processor to transmit the demodulated signal to the first communication processor, and may modulate a signal received from the first communication processor into a signal that can be processed by the first front-end to transmit the modulated signal to the first front-end. The second transceiver may demodulate a signal received from the second front-end into a signal that can be processed by the second communication processor to transmit the demodulated signal to the second communication processor, and may modulate a signal received from the second communication processor into a signal that can be processed by the second front-end to transmit the modulated signal to the second front-end.

According to various embodiments, the electronic device may further include a first printed circuit board arranged on the first housing structure (e.g., the first substrate 271 of FIG. 2C) and a second printed circuit board arranged on the second housing structure (e.g., the second substrate 272 of FIG. 2C). The first communication processor and the first wireless communication circuit may be mounted on the first printed circuit board, and the second communication processor may be mounted on the second printed circuit board.

The embodiments of the disclosure disclosed in the specification and drawings are only provided for specific examples to easily explain the technical content according to the embodiments of the disclosure and to aid understanding of the embodiments of the disclosure, and limit the scope of the embodiments of the disclosure. Therefore, the scope of various embodiments of the disclosure should be interpreted as being included in the scope of various embodiments of the disclosure in addition to the embodiments disclosed herein, all changes or modified forms derived based on the technical idea of various embodiments of the disclosure.

The invention claimed is:

1. An electronic device comprising:
a foldable housing configured to include:
a hinge structure,
a first housing structure connected to the hinge structure and including a first surface facing a first direction, a second surface facing a second direction opposite the first direction, and a first side member that encompasses at least a portion of the space between the first and second surfaces and includes at least one first conductive part, and
a second housing structure connected to the hinge structure, and including a third surface facing a third direction, a fourth surface facing a fourth direction opposite the third direction, and a second side member that encompasses at least a portion of the space between the third and fourth surfaces and includes at least one second conductive part, the second housing structure brought into contact with respect to the first housing structure with the hinge structure as the center thereof, wherein the first surface faces the third surface in a folded state and the third direction is the same as the first direction in an unfolded state;
a flexible display extending from the first surface to the third surface;
a communication processor arranged inside the first housing structure;
a first wireless communication circuit arranged inside the first housing structure, electrically connected to the first conductive part and the communication processor, and configured to transmit and/or receive a first signal having a first frequency;
a second wireless communication circuit arranged inside the second housing structure, electrically connected to the second conductive part and the communication processor, and configured to transmit and/or receive a second signal having a second frequency; and
a transceiver arranged inside the first housing structure, electrically connected between the first wireless communication circuit and the communication processor, and electrically connected between the second wireless communication circuit and the communication processor,
wherein the first wireless communication circuit includes a first front-end for amplifying and outputting an input signal, and the second wireless communication circuit includes a second front-end for amplifying and outputting an input signal, and
wherein the transceiver demodulates a signal received from the first front-end into a signal to be processed by the communication processor and modulates a signal received from the communication processor into a signal to be processed by the first front-end, demodulates a signal received from the second front-end into a signal to be processed by the communication processor, and modulates a signal received from the communication processor into a signal to be processed by the second front-end.

2. The electronic device of claim 1, wherein the first frequency includes a frequency between about 1 GHz and about 4 GHz, and the second frequency includes a frequency between about 600 MHz and about 1 GHz.

3. The electronic device of claim 1, wherein the first side member is coupled to the second surface or integrally formed with the second surface, and the second side member is coupled to the fourth surface or integrally formed with the fourth surface.

4. The electronic device of claim 1, further comprising:
a flexible printed circuit board (FPCB) configured to electrically connect the communication processor and the transceiver to the second wireless communication circuit.

5. The electronic device of claim 4, wherein the FPCB extends from the first housing structure to the second housing structure across the hinge structure.

6. The electronic device of claim 4, wherein the first wireless communication circuit receives the signal having the first frequency from the communication processor through the transceiver, and transmits the signal having the first frequency to the communication processor through the transceiver, and
wherein the second wireless communication circuit receives the signal having the second frequency from the communication processor through the FPCB and the transceiver and transmits the signal having the second frequency to the communication processor through the FPCB and the transceiver.

7. The electronic device of claim 4, further comprising:
a power management module arranged in the first housing structure,
wherein power from the power management module is supplied to the second wireless communication circuit through the FPCB.

8. The electronic device of claim 1, further comprising:
an FPCB or a coaxial cable electrically connects the first wireless communication circuit and the second wireless communication circuit so that the signal having the second frequency is transmitted and/or received.

9. The electronic device of claim 8, wherein the FPCB or the coaxial cable extends from the first housing structure to the second housing structure across the hinge structure.

10. The electronic device of claim 1, further comprising:
a first printed circuit board arranged on the first housing structure, and a second printed circuit board arranged on the second housing structure,
wherein the communication processor and the first wireless communication circuit are mounted on the first printed circuit board, and the second wireless communication circuit is mounted on the second printed circuit board.

11. An electronic device comprising:
a foldable housing configured to include:
a hinge structure,
a first housing structure connected to the hinge structure and including a first surface facing a first direction, a second surface facing a second direction opposite the first direction, and a first side member that encompasses at least a portion of the space between the first and second surfaces and includes at least one conductive part, and
a second housing structure connected to the hinge structure and including a third surface facing a third direction, a fourth surface facing a fourth direction opposite the third direction, and a second side member that encompasses at least a portion of the space between the third and fourth surfaces, the second housing structure brought into contact with the first housing structure with respect to the hinge structure as the center thereof, wherein the first surface faces the third surface in a folded state and the third direction is the same as the first direction in an unfolded state;
a flexible display extending from the first surface to the third surface;

a first communication processor arranged inside the first housing structure;

a second communication processor arranged inside the second housing structure and electrically connected to the first communication processor;

a first wireless communication circuit arranged inside the first housing structure, electrically connected to the conductive part and the first communication processor, and configured to transmit and/or receive a first signal having a first frequency;

an antenna structure arranged inside the second housing structure and including a printed circuit board and at least one antenna element; and a second wireless communication circuit electrically connected to the antenna element and the second communication processor and configured to transmit and/or receive a second signal having a second frequency, wherein:

the first wireless communication circuit includes a first transceiver and a first front-end, and the second wireless communication circuit includes a second transceiver and a second front-end, the first front-end processes a signal received from the first conductive part to transmit the processed signal to the first transceiver, and processes a signal received from the first transceiver to transmit the processed signal to the conductive part, the second front-end processes a signal received from the antenna structure to transmit the processed signal to the second transceiver, and processes a signal received from the second transceiver to transmit the processed signal to the antenna structure, the first transceiver demodulates a signal received from the first front-end into a signal that can be processed by the first communication processor to transmit the demodulated signal to the first communication processor, and modulates a signal received from the first communication processor into a signal that can be processed by the first front-end to transmit the modulated signal to the first front-end, and the second transceiver demodulates a signal received from the second front-end into a signal that can be processed by the second communication processor to transmit the demodulated signal to the second communication processor, and modulates a signal received from the second communication processor into a signal that can be processed by the second front-end to transmit the modulated signal to the second front-end.

12. The electronic device of claim 11, wherein the first frequency includes a frequency between about 600 MHz and about 3 GHz, and the second frequency includes a frequency between about 3 GHz and about 100 GHz.

13. The electronic device of claim 11, further comprising:

an FPCB configured to electrically connects the first communication processor and the second communication processor, wherein the FPCB extends from the first housing structure to the second housing structure across the hinge structure, and the second communication processor receives a signal to be processed by the second wireless communication circuit from the first communication processor through the FPCB, and transmits the signal processed by the second wireless communication circuit to the communication processor through the FPCB.

* * * * *